US011098688B2

(12) United States Patent
Awadi et al.

(10) Patent No.: US 11,098,688 B2
(45) Date of Patent: Aug. 24, 2021

(54) SYSTEM AND METHODS FOR STARTING AN ENGINE

(71) Applicant: Ford Global Technologies, LLC, Dearborn, MI (US)

(72) Inventors: Ahmed Awadi, Farmington Hills, MI (US); Kenneth Carl Leisenring, Dearborn, MI (US); Scott Makowski, Northville, MI (US); Eric Michael Rademacher, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/551,639

(22) Filed: Aug. 26, 2019

(65) Prior Publication Data

US 2021/0062775 A1    Mar. 4, 2021

(51) Int. Cl.
*F02N 11/08* (2006.01)
*B60W 30/18* (2012.01)
*B60W 30/192* (2012.01)

(52) U.S. Cl.
CPC ... *F02N 11/0811* (2013.01); *B60W 30/18018* (2013.01); *F02N 11/0814* (2013.01); *B60W 30/192* (2013.01)

(58) Field of Classification Search
CPC ............ F02N 11/0811; F02N 11/0814; B60W 30/18018; B60W 30/192
See application file for complete search history.

(56) References Cited

U.S. PATENT DOCUMENTS

| 9,056,606 | B1 | 6/2015 | Rademacher et al. |
| 9,404,461 | B2* | 8/2016 | Gibson ............... B60W 30/192 |
| 2003/0051692 | A1* | 3/2003 | Mizutani ............... F02D 11/105 |
| | | | 123/179.15 |
| 2011/0239988 | A1* | 10/2011 | Reiche .................. F02P 5/1506 |
| | | | 123/406.76 |
| 2013/0066539 | A1* | 3/2013 | Leone ................. F02D 41/0002 |
| | | | 701/113 |

FOREIGN PATENT DOCUMENTS

| CN | 104057951 A | 9/2014 |
| CN | 106285972 A | 1/2017 |
| JP | 2008-051014 | * 3/2008 |

OTHER PUBLICATIONS

JP 2008-051014, Okumura, Mar. 2008: machine translation.*

* cited by examiner

*Primary Examiner* — Phutthiwat Wongwian
*Assistant Examiner* — Diem T Tran
(74) *Attorney, Agent, or Firm* — Geoffrey Brumbaugh; McCoy Russell LLP

(57) ABSTRACT

Systems and methods for operating a vehicle that includes an engine that may be automatically stopped and started are described. In one example, an amount of time to start an engine and a rate of engine acceleration are adjusted in response to what type of event triggered an automatic engine start.

16 Claims, 4 Drawing Sheets

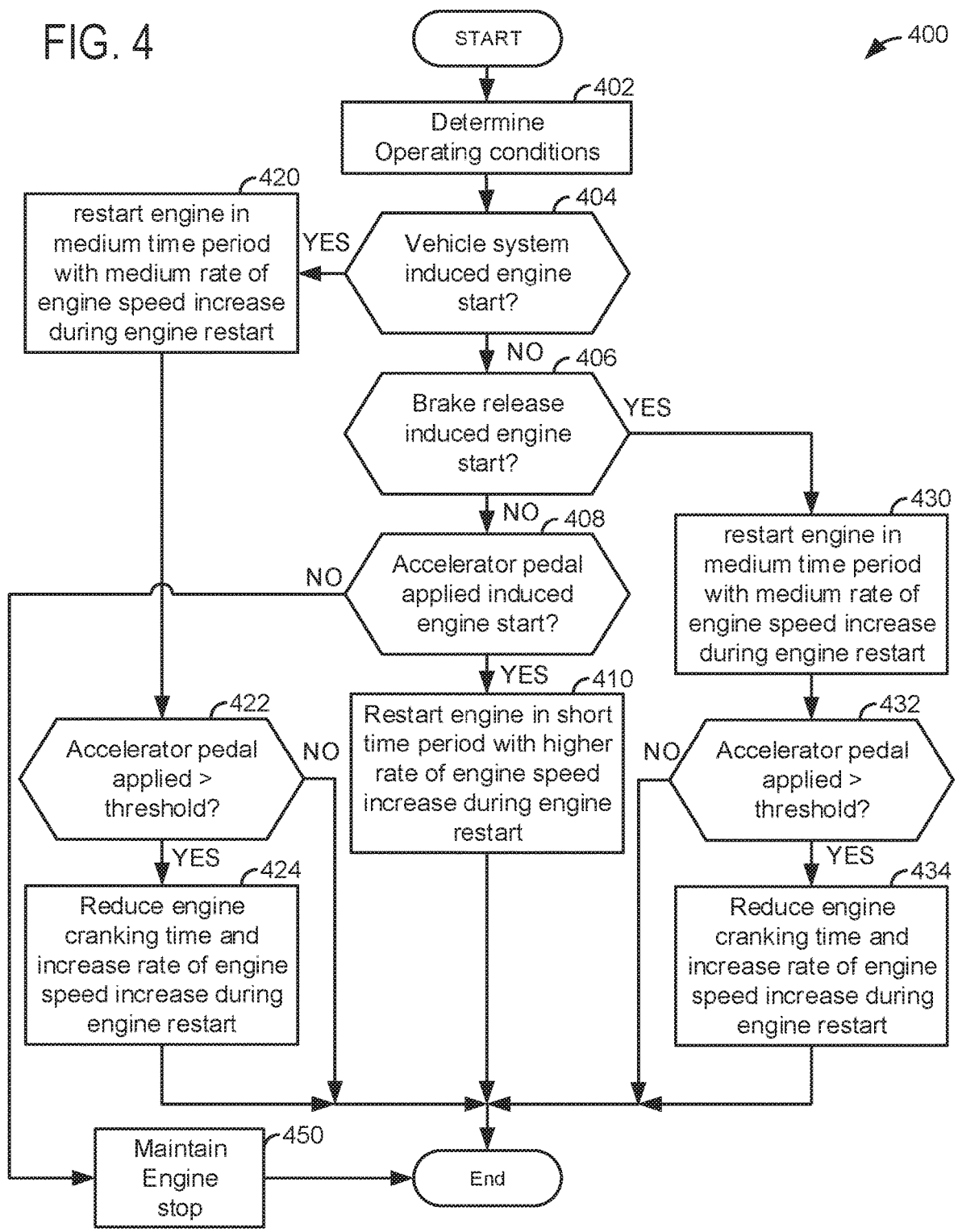

SYSTEM AND METHODS FOR STARTING AN ENGINE

FIELD

The present description relates to methods and a system for automatically starting an engine that may be automatically stopped to conserve fuel. The methods and systems may be particularly useful to improve driver satisfaction and control engine noise and vibration during automatic engine starting.

BACKGROUND AND SUMMARY

An engine of a vehicle may be automatically started in response to vehicle operating conditions. The engine may be started so that the vehicle may continue to its intended destination or the engine may be started so that the vehicle may continue to operate in an expected way. For example, the engine may be restarted in response to releasing a brake pedal of the vehicle. Further, the engine may be restarted so that a state of battery charge (SOC) is not reduced to less than a threshold SOC while the engine is stopped. While an operator may enjoy reduced fuel consumption by the engine when the engine is stopped, the operator may become aggravated by engine noise and vibration when the engine is restarted. Therefore, it may be desirable to provide a way of automatically starting an engine that may reduce the possibility of aggravating vehicle occupants.

The inventors herein have recognized the above-mentioned issues and have developed an engine operating method, comprising: adjusting an amount of engine cranking time via a controller in response to an automatic engine start triggering event; and automatically starting an engine in response to the automatic engine start triggering event via the controller.

By adjusting an amount of engine cranking time, it may be possible to provide smoother and less noticeable engine starts so that vehicle occupants may take less notice of engine starting when an engine is automatically restarted. In particular, when engine starting is less urgent, such as when the engine is started for a low battery state of charge (SOC), engine cranking time may be increased so that intake manifold pressure may be reduced before fuel is injected to the engine and the engine starts. The lower intake manifold pressure may lower pressure in engine cylinders, thereby reducing engine noise during engine run-up. Further, engine spark timing may be adjusted so that engine noise may be reduced during conditions when engine starting may be less urgent. Conversely, during conditions when engine starting is more urgent, such as when the vehicle's driver wishes to accelerate the vehicle, the amount of engine cranking time may be reduced via injecting fuel to the engine just before engine cranking begins or shortly after engine cranking begins. In addition, spark timing may be advanced during an engine start when the vehicle's driver wishes to accelerate the vehicle so that engine acceleration increases at a higher rate after engine cranking.

The present description may provide several advantages. In particular, the approach may adjust an engine cranking time and engine acceleration during engine starting so that vehicle occupants may find engine starting to be less noticeable. Further, the engine cranking time and the engine acceleration may be adjusted so that a vehicle may accelerate in a timely manner when vehicle acceleration may be desired. In addition, the approach may be applicable to engine that have starter motors and vehicles that are started via starter/generators.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 4 shows a method for operating an engine.

DETAILED DESCRIPTION

Figure 2:
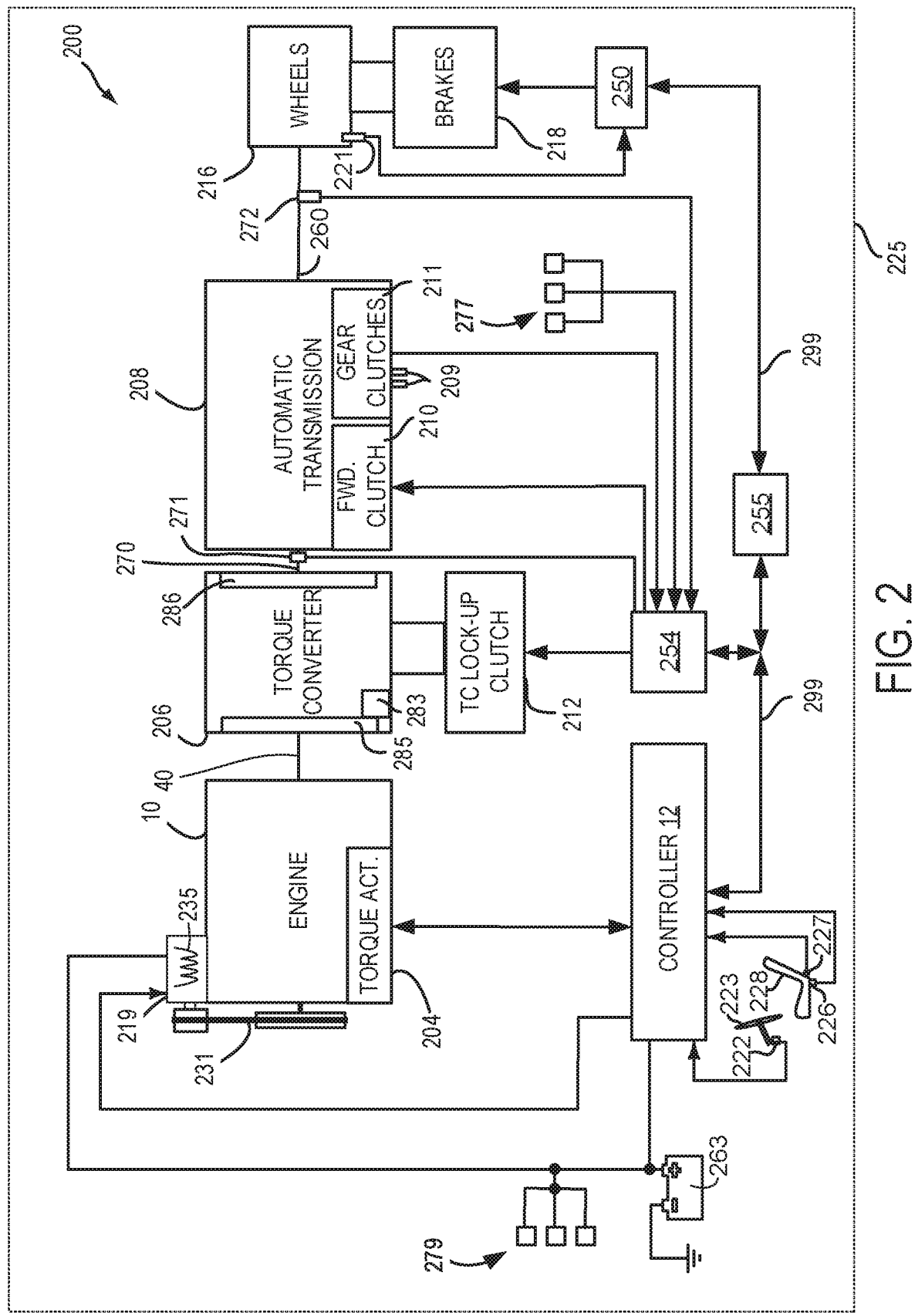
FIG. 2 is a schematic diagram of a vehicle driveline.
Figure 3:
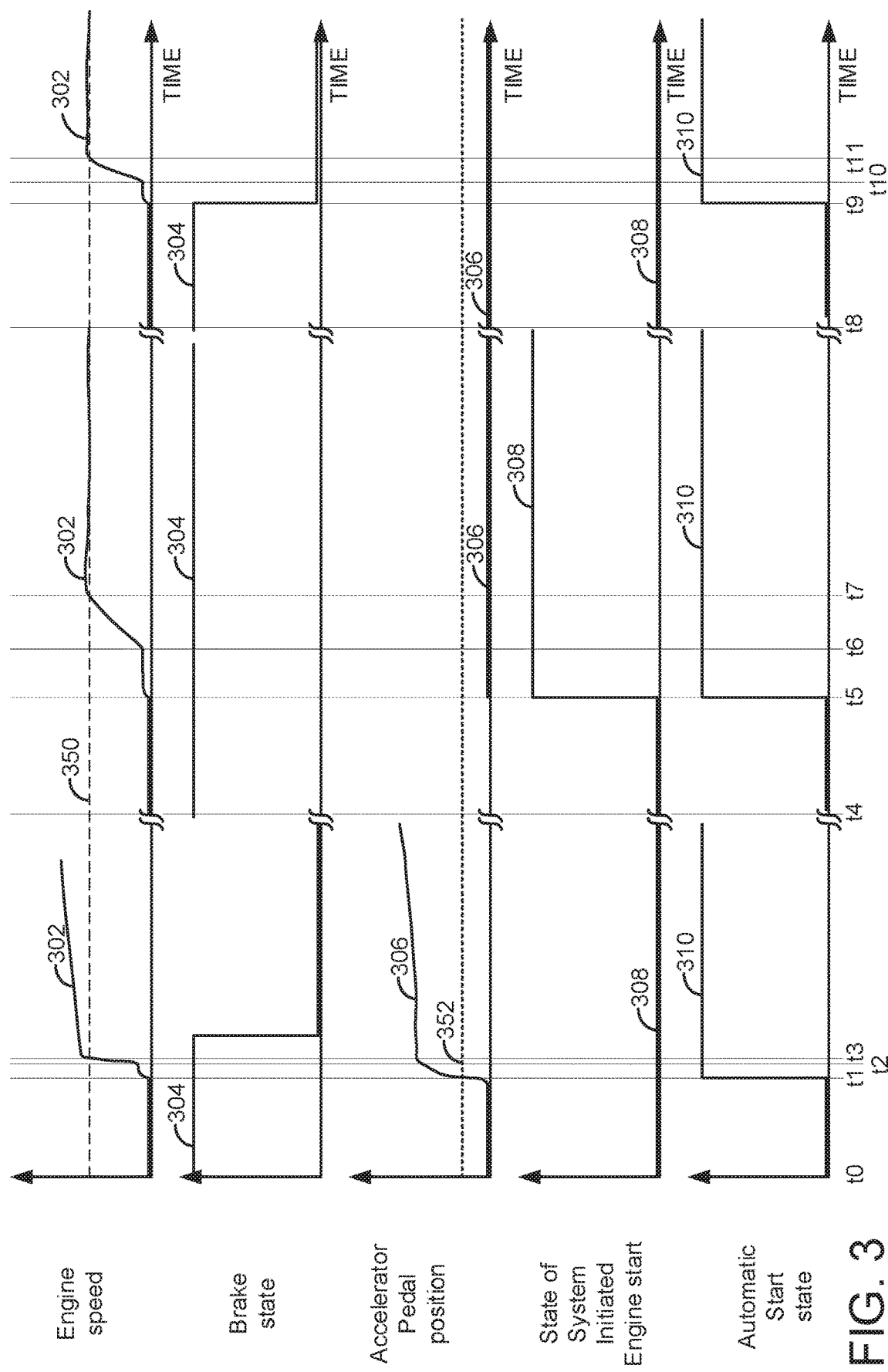
FIG. 3 shows an example engine operating sequence.

The present description is related to restarting an engine that has been automatically stopped. The engine may be automatically restarted without a human driver specifically requesting an engine start via a dedicated input device (e.g., an ignition switch or pushbutton). The engine may be of the type shown in FIG. 1 or the engine may be a diesel engine. The engine may be included in a driveline of a vehicle as is shown in FIG. 2. The engine may be operated as is shown in the sequence of FIG. 3 according to the method of FIG. 4. The method of FIG. 4 provides different ways of automatically starting an engine that are based on the type of event that triggers the automatic engine start.

Figure 1:
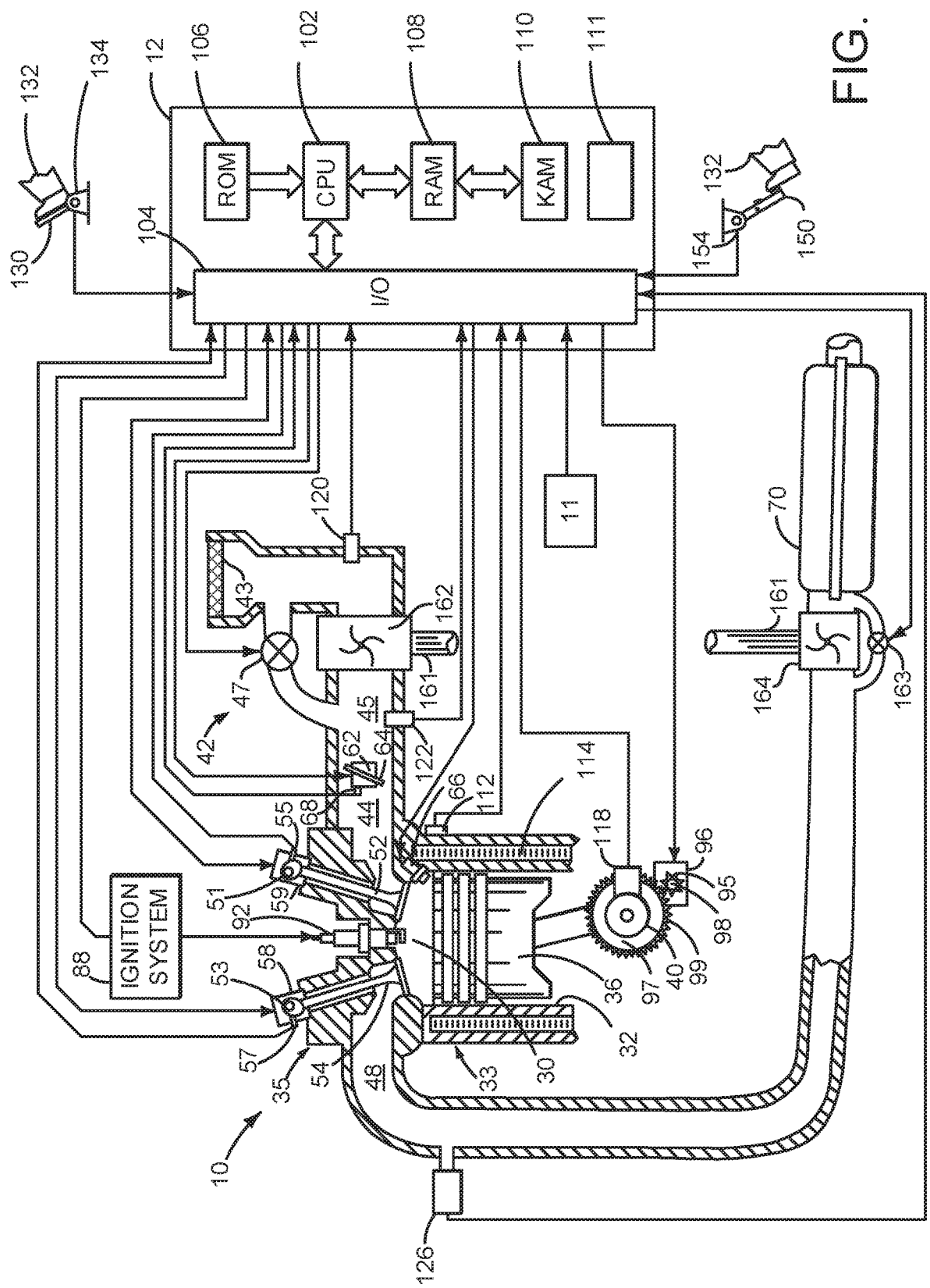
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Controller 12 receives signals from the various sensors shown in FIGS. 1 and 2. Further, controller 12 employs the actuators shown in FIGS. 1 and 2 to adjust engine operation based on the received signals and instructions stored in non-transitory memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 may also include one or more timers and/or counters 111 that keep track of an amount of time between a first event and a second event. The timer and/or counters may be constructed in hardware or software. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, and information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250, thereby providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

Engine 10 may be started with an engine starting system shown in FIG. 1. Further, torque of engine 10 may be adjusted via torque actuator 204, such as a fuel injector, throttle, etc. An engine output torque may be transmitted to torque converter 206 via crankshaft 40. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate forward clutch 210 and gear clutches 211. Pump 283 is driven via impeller 285, which rotates at a same speed as crankshaft 40.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates the requested driver demand torque to the engine. Vehicle system controller 255 requests the engine torque from engine controller. If the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device (e.g., battery) 263, controller 12 adjust current supplied to field winding 235 of alternator 219. Alternator 219 converts torque from engine 10 into electrical energy and it supplies the electrical energy to electric energy storage device 263. Electrical energy storage device 263 and alternator 219 may provide electrical power to electrical accessories 279, which may include but are not limited to front and rear windshield resistive heaters, vacuum pumps, climate control fans, and lights. Vehicle system controller 255 may request increased engine torque to overcome the charging torque to meet the driver demand torque.

In response to a request to decelerate vehicle 225, vehicle system controller 255 requests a friction braking torque by applying friction brakes 218. Accordingly, torque control of the various powertrain components may be supervised by vehicle system controller 255 with local torque control for the engine 10, transmission 208, and brakes 218 provided via engine controller 12, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that wheels do not lock for an extended period of time.

Controller 12, or alternatively controller 255 may receive position information from steering wheel sensor 222, which provides a position of steering wheel 223. Seat sensors 226 and 227 provide position information of seat 228. The positions indicated by sensors 222, 226, and 227 may be referred to as vehicle driver settings since a driver may adjust positions of seat 228 and steering wheel to suit the driver's comfort. The positions for a particular driver may be stored in controller volatile memory and the positions may be associated with a particular key fob or human/machine interface setting. If the positions of the seat or the steering wheel change from positions stored in memory and that correspond to a particular human driver, then controller 12 or control 255 may determine that a change in state of the vehicle driver settings has been made for a new human driver.

The system of FIGS. 1 and 2 is only one example system where the methods described herein may be applied. For example, the methods described herein may apply to parallel and series hybrid and partial hybrid vehicles. Further, the methods described herein may be applied to personal or commercial vehicles including cars and trucks.

Thus, the system of FIGS. 1 and 2 provide for a system, comprising: an engine; and a controller including executable instructions stored in non-transitory memory to adjust an engine cranking time to a first amount of time and an engine acceleration rate to a first acceleration rate in response to releasing a brake, and to adjust an engine cranking time to a second amount of time and an engine acceleration rate to a second acceleration rate in response to applying an accelerator pedal. The system includes where the first amount of time is longer than the second amount of time. The system includes where the first acceleration rate is lower than the second acceleration rate. The system further comprises additional instructions to adjust the engine cranking time to a third amount of time in response to a system initiated engine start request that is not directly based on an operator action. The system includes where the engine cranking time is adjusted via adjusting a time fuel is injected to the engine.

Referring now to FIG. 3, example plots of a vehicle operating sequence are shown. The operating sequence may be performed via the system of FIGS. 1 and 2 in cooperation with the method of FIG. 4. Vertical lines at times t0-t11 represent times of interest during the sequence. The plots in FIG. 4 are time aligned and occur at the same time. The SS marks along the horizontal axis represent breaks in time and the duration of the breaks may be long or short.

The first plot from the top of FIG. 4 is a plot of engine speed versus time. The vertical axis represents engine speed and the engine is speed increases in the direction of the vertical axis arrow. The horizontal axis represents time and time increases from the left side of the figure to the right side of the figure. Line 302 represents engine speed and horizontal line 350 represents engine idle speed.

The second plot from the top of FIG. 3 is a plot of vehicle brake state versus time. The vehicle brake may be friction brakes or electo-magnetic brakes. The vertical axis represents vehicle brake state and the vehicle brake is applied when trace 304 is at a higher level near the vertical axis arrow. The vehicle brake is not applied when trace 304 is at a lower level near the horizontal axis. The horizontal axis represents time and time increases from the left side of the figure to the right side of the figure. Trace 304 represents the vehicle brake state.

The third plot from the top of FIG. 3 is a plot of accelerator pedal position versus time. The vertical axis represents accelerator pedal position and the accelerator pedal position increases in the direction of the vertical axis arrow. The horizontal axis represents time and time increases from the left side of the figure to the right side of the figure. Trace 306 represents the accelerator pedal position. Horizontal line 352 represents a threshold accelerator pedal position and an automatic engine start may be initiated when the accelerator pedal is applied to a level above line 352.

The fourth plot from the top of FIG. 3 is a plot of a state of system initiated engine start versus time. The vertical axis represents state of system initiated engine start and a system initiated engine start is asserted when trace 308 is at a higher level near the vertical axis arrow. A system initiated engine start is not asserted when trace 308 is at a lower level near the horizontal axis. Trace 308 represents the state of system initiated engine start.

The fifth plot from the top of FIG. 3 is a plot of an automatic engine start state versus time. The vertical axis represents the automatic engine start state and the automatic engine start state is asserted when trace 310 is at a higher level near the vertical axis arrow. The automatic engine start state is not asserted when trace 310 is at a lower level near the horizontal axis. Trace 310 represents the automatic engine start state.

At time t0, the engine is stopped (e.g., not rotating and not combusting fuel) and the vehicle brakes are applied. The accelerator pedal is not applied and a system initiated engine start is not active. Additionally, an automatic engine start is not active or in progress. The engine has been automatically stopped (e.g., the engine has not been requested to stop via a human operator or driver providing input to an input device that is dedicated solely to engine stopping and/or starting, a pushbutton or key switch for example).

At time t1, the vehicle's human driver (not shown) has applied the accelerator pedal and the accelerator pedal position exceeds threshold 352 so an automatic engine start is initiated. The accelerator pedal position being greater than threshold 352 indicates that the vehicle's driver intends to move the vehicle quickly, so a fast engine restart is initiated. A fast engine restart may include a short engine cranking time or duration and fast engine acceleration rate from engine cranking speed to engine idle speed. Engine cranking time may begin at a time when an electric machine begins to apply torque to rotate a stopped engine. The engine cranking time may end after a first combustion event (e.g., combustion of air and fuel in a cylinder) since a most recent engine stop. However, in some examples, the engine may be directly started (e.g., started without the engine being rotated via an electric machine), such that engine cranking time may be reduced to zero for a fast engine start or restart. In this example, engine cranking begins at time t1, the vehicle brake is applied, and a system initiated engine restart is not activated. In one example, the engine cranking time or duration may be made a short cranking time or duration via injecting fuel to the engine before the engine starts to rotate, at the same time the engine begins to rotate, or shortly after the engine begins to rotate. Injecting fuel to the engine early allows combustion to occur in engine cylinders sooner. In addition, when intake manifold pressure is higher, the engine acceleration rate from cranking speed to engine idle speed may be higher. The rate of engine acceleration from engine cranking speed to engine idle speed may be increased via opening the throttle to increase engine intake manifold pressure and increasing an amount of fuel injected to match the amount of air entering engine cylinders. In addition, engine spark timing may be advanced (e.g., 10 degrees before top-dead-center compression stroke of a cylinder that has received fuel) to increase a rate of engine acceleration.

Between time t1 and time t2, the engine is rotated via an electric machine (e.g., cranked) while spark and fuel are supplied to the engine (not shown). The automatic engine start state continues to be asserted since an automatic engine start or restart is underway. The vehicle brake is applied and the accelerator pedal position continues to increase. A system initiated engine restart is not activated at this time.

At time t2, a first combustion event in a cylinder occurs since a most recent engine stop (e.g., time t1) and the engine begins to accelerate above engine cranking speed. The vehicle brake is still applied and the accelerator pedal position continues to increase. A system initiated engine start or restart is not initiated and an automatic engine start continues. The amount of time between time t1 and time t2 is the engine cranking time or duration. The time t2 marks the beginning of the engine run-up period.

At time t3, the engine reaches its idle speed and the engine run-up period ends. The rate of change of engine speed between time t2 and time t3 is the engine acceleration rate between engine cranking speed and engine idle speed. The brake pedal is still applied and a system initiated engine start is not underway at time t3. A system initiated engine start or restart is not initiated and an automatic engine start continues. The accelerator initiated engine start ends at time t3.

After time t3, the engine speed continues to increase and the vehicle brake is released. The accelerator pedal position falls and then increases. The system initiated engine start or restart is not indicated and the automatic engine restart continues to be asserted. The engine is automatically stopped before time t4.

At time t4, the engine is stopped (e.g., not rotating and not combusting fuel) and the vehicle brakes are applied. The accelerator pedal is not applied and a system initiated engine start is not active. Further, an automatic engine start is not active or in progress.

At time t5, a system initiated engine restart occurs. A system initiated engine restart may be initiated for a variety of reasons including but not limited to battery SOC less than a threshold SOC, a change in vehicle heating or air conditioning conditions, a change in steering angle, or other conditions that are not a request by a human to start the engine that is input to a device that is dedicated solely to stopping and/or starting the engine. The accelerator pedal is not applied and the vehicle brake is applied. An automatic engine restart is triggered by the system initiated restart.

The absence of the accelerator pedal position being greater than threshold 352 and the absence of the vehicle brake being released is an indication that the vehicle's driver does not intend to move the vehicle, so a slower engine restart is initiated. A slower engine restart may include a longer engine cranking time and lower engine acceleration rate from engine cranking speed to engine idle speed. In this example, engine cranking begins at time t5 and it ends at time t6.

In one example, the engine cranking time may be made a longer engine cranking time via delaying injecting fuel to the engine until intake manifold pressure is reduced to less than a first threshold pressure. Injecting fuel to the engine later allows engine intake manifold pressure to be pumped down via the engine's cylinders so that the engine acceleration rate from engine cranking speed to engine idle speed may be lower. The lower rate of engine acceleration may provide for less engine noise and less engine vibration. The rate of engine acceleration from engine cranking speed to engine idle speed may be decreased via keeping the throttle in a fully closed position to decrease engine intake manifold pressure as engine cranking time increases. The amount of fuel injected to the engine during engine starting may be decreased as compared to the amount of fuel injected at time t1. In addition, engine spark timing may be retarded (e.g., 10 degrees after top-dead-center compression stroke of a cylinder that has received fuel) to decrease a rate of engine acceleration.

Between time t5 and time t6, the engine is rotated via an electric machine (e.g., cranked) while spark and fuel are supplied to the engine (not shown). The automatic engine start state continues to be asserted since an automatic engine start or restart is underway. The vehicle brake is applied and the accelerator pedal position continues to increase. A system initiated engine restart is not activated.

At time t6, a first combustion event in a cylinder occurs since a most recent engine stop (e.g., time t5) and the engine begins to accelerate above engine cranking speed. The vehicle brake is still applied and the accelerator pedal is not applied. The system initiated engine start or restart continues and the automatic engine start continues to be asserted. The amount of time between time t5 and time t6 is the engine cranking time, and the amount of engine cranking time between time t5 and time t6 is greater than the amount of engine cranking time between time t1 and time t2 because the engine is started slow.

At time t7, the engine reaches its idle speed and the engine run-up period ends. The rate of change of engine speed between time t6 and time t7 is the engine acceleration rate between engine cranking speed and engine idle speed. The brake pedal is still applied and a system initiated engine start is not underway at time t7. A system initiated engine start or restart ends at time t7.

After time t7, the engine speed levels off near the engine idle speed. The system initiated engine start or restart continues to be indicated and the automatic engine restart continues to be asserted. The brake and the accelerator pedal are not applied. The engine is automatically stopped before time t8.

At time t8, the engine is stopped (e.g., not rotating and not combusting fuel) and the vehicle brakes are applied. The accelerator pedal is not applied and a system initiated engine start is not active. Further, an automatic engine start is not active or in progress.

At time t9, a vehicle brake system initiated engine restart occurs. A vehicle brake release initiated engine restart may be initiated in anticipation of the vehicle's driver requesting vehicle acceleration. In other words, releasing the vehicle brake may be indicative of a subsequent vehicle acceleration since application of an accelerator pedal often follows release of a brake. The accelerator pedal is not applied and the system initiated engine restart is not asserted. An automatic engine restart is triggered by the brake release and engine cranking begins when the vehicle brake is released.

The absence of the accelerator pedal position being greater than threshold 352 and the vehicle brake being released is an indication that the vehicle's driver may want to accelerate the vehicle in the near future, but the vehicle launch is not immediately requested, so a medium engine cranking duration and a medium engine acceleration rate is initiated. In this example, engine cranking begins at time t9 and it ends at time t10.

In one example, the engine cranking time may be made a medium via delaying injecting fuel to the engine until intake manifold pressure is reduced to less than a second threshold pressure, the second threshold pressure greater than the first threshold pressure. Injecting fuel to the engine a little while later allows engine intake manifold pressure to be pumped down via the engine's cylinders so that the engine acceleration rate from engine cranking speed to engine idle speed may be a little lower. The medium rate of engine acceleration may provide for less engine noise and less engine vibration. The rate of engine acceleration from engine cranking speed to engine idle speed may be made medium via opening the throttle a small amount while the engine is cranking so that there may be less vacuum in the engine's intake manifold. The medium intake manifold pressure level may help to provide a medium engine acceleration rate from engine cranking speed to engine idle speed. The amount of fuel injected to the engine during engine starting may be decreased as compared to the amount of fuel injected at time t1 and increased as compared to the amount of fuel injected at time t5. In addition, engine spark timing may be retarded a medium amount (e.g., to top-dead-center compression stroke of a cylinder that has received fuel) to control the engine acceleration rate to a medium level.

Between time t9 and time t10, the engine is rotated via an electric machine (e.g., cranked) while spark and fuel are supplied to the engine (not shown). The automatic engine start state is asserted since an automatic engine start or restart is underway. The vehicle brake is applied and the accelerator pedal is not applied. A system initiated engine restart is not activated.

At time t10, a first combustion event in a cylinder occurs since a most recent engine stop (e.g., time t9) and the engine begins to accelerate above engine cranking speed. The vehicle brake is still released and the accelerator pedal is not applied. The system initiated engine start or restart is not asserted and the automatic engine start continues to be asserted. The amount of time between time t9 and time t10 is the engine cranking time, and the amount of engine cranking time between time t9 and time t10 is greater than the amount of engine cranking time between time t1 and time t2 and less than the engine cranking time between time t5 and time t6.

After time t10, the engine speed increases up to idle speed at a rate that is below the engine acceleration rate up to idle speed after time t2 and above the engine acceleration rate up to idle speed after time t6. The reduced engine acceleration rate may reduce engine noise and vibration, which may improve customer satisfaction. The brake release initiated engine start or restart continues to be indicated and the automatic engine restart continues to be asserted. The brake is not applied and the accelerator pedal is not applied.

After time t11, the engine speed levels off near the engine idle speed. The brake release initiated engine start or restart continues to be indicated and the automatic engine restart continues to be asserted. The brake and the accelerator pedal are not applied.

In this way, the engine's cranking duration and rate of engine acceleration may be adjusted responsive to the type or source of engine restart request. Vehicle occupants may find that adjusting engine operation in this way increases vehicle occupant satisfaction.

Referring now to FIG. 4, a flow chart of a method for operating an engine that includes automatic stopping and starting capability is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world. Prior to the execution of method 400, the engine has been automatically stopped (e.g., not rotating and not combusting fuel) without a driver providing input to a device that has a sole function of starting and/or stopping the engine.

At 402, method 400 determines engine operation conditions. Operating conditions may include but are not limited to engine speed, battery SOC, battery health value, battery current, battery resistance, battery voltage, engine load, driver demand torque, and engine operating state. The operating conditions may be determined via inputs to the controller. Method 400 proceeds to 404.

At 404, method 400 judges if conditions are present for a system induced engine start. A system induced engine start may be initiated in response to battery SOC being less than a threshold charge, a change in operating state of a heating and/or air conditioning system, a change in steering wheel angle, change in a traffic signal that is observed via a camera or other vehicle input, etc. The system conditions being present for inducing an engine restart due to a system may be referred to as a triggering event. The system condition that may initiate a system induced engine restart (e.g., the automatic engine start triggering event) is a vehicle system change of state that is not a requested by a human to start the engine and input to a device that is dedicated solely to stopping and/or starting the engine. If method 400 judges that conditions are present for a system initiated engine start or restart, the answer is yes and method 400 proceeds to 420.

At 420, method 400 requests and commands a slower engine start that includes a longer engine cranking time and a slower engine acceleration rate between a time of an initial combustion event (e.g., combustion of fuel in a cylinder of the engine) in the engine since a most recent engine stop and a time when the engine reaches idle speed for a first time after the most recent engine stop. Method 420 may provide the longer duration engine cranking time via delaying fuel injection beginning from a time when an electric machine first begins to rotate the engine after a most recent engine stop (e.g., absence of engine rotation) for a predetermined amount of time or for a predetermined number of engine events since the time when the electric machine first begins to rotate the engine after the most recent engine stop. For example, method 400 may generate a longer engine cranking time via delaying fuel injection for 2 seconds after the time when the electric machine first begins to rotate the engine after the most recent engine stop. Alternatively, method 400 may generate a longer engine cranking time via delaying fuel injection for ten compression strokes of the engine after the time when the electric machine first begins to rotate the engine after the most recent engine stop. In still another example, method 400 may delay fuel injection until engine intake manifold pressure is less than a first threshold pressure. Method 400 may begin to inject fuel for a first time since the most recent engine stop when engine intake manifold pressure is less than the first threshold pressure.

Method 400 also adjusts the engine throttle opening amount and spark timing to generate a slower rate of engine acceleration between a time of the first combustion event in the engine since the most recent engine stop and a time that the engine reaches engine idle speed (e.g., 800 RPM) since the most recent engine stop. In one example, the engine throttle position may be adjusted to fully closed to generate the slower engine acceleration rate. The engine spark timing may be adjusted to a retarded spark timing (e.g., five crankshaft degrees after top-dead-center compression stroke of the cylinder receiving the spark) during engine cranking and run-up (e.g., the time between when the engine first combusts fuel after a most recent engine stop and the time that the engine reaches its idle speed). The retarded spark timing and closed throttle may reduce engine acceleration from a medium rate of engine acceleration between engine cranking speed and engine idle speed. Method 400 proceeds to 422.

At 422, method 400 judges if the accelerator pedal is applied to a position that is greater than a threshold position (e.g., greater than 5% of full scale accelerator pedal movement). If so, the answer is yes and method 400 proceeds to 424. Otherwise, the answer is no and method 400 proceeds to exit while the engine cranking duration is medium and the engine acceleration rate from engine cranking speed to engine idle speed is a medium rate of engine acceleration. Thus, method 400 checks the accelerator pedal position during engine starting until the engine reaches idles speed and adjusts the engine cranking duration and engine acceleration rate if the accelerator pedal is applied.

At 424, method 400 reduces the engine cranking time, if the engine is still cranking, and increases the engine acceleration rate between the time that the engine exits cranking and the time the engine reaches its idle speed. Method 400 may reduce the engine cranking time via injecting fuel earlier than the timing described at 420. For example, if fuel injection is initially delayed for 2 seconds after the time when the electric machine first begins to rotate the engine after the most recent engine stop, then the fuel injection may be reduced to 0.5 seconds after the time when the electric machine first begins to rotate the engine after the most recent engine stop. Further, method 400 increases the engine acceleration rate between the time of the first combustion event since the most recent engine stop and the time that the engine reaches its idle speed via increasing the throttle opening amount and advancing the engine spark timing. For example, the engine throttle opening amount may be increased to 1% of full scale during engine cranking and run-up. Further, if the spark timing was previously five crankshaft degrees after top-dead-center compression stroke of the cylinder receiving the spark, then the engine spark timing may be advanced to ten crankshaft degrees before top-dead-center compression stroke of the cylinder receiving the spark. In these ways, engine cranking time may be reduced and engine acceleration during engine run-up may be increased when the accelerator pedal is applied after a system induced engine restart so that driver demand may be met. Method 400 proceeds to exit.

It should be noted that increasing the throttle opening amount at 420 and 424 may cause an amount of fuel injected to increase in proportion with the engine airflow increase that may be the result of opening the engine throttle. For example, during engine run-up, method 400 may control the engine air-fuel ratio to a stoichiometric air-fuel ratio such that any increase in engine air flow may be matched with an increase in an amount of fuel that is injected to the engine.

At 406, method 400 judges if conditions are present for a vehicle brake release induced engine start. If method 400 judges that the vehicle brake (e.g., friction brake or electric machine brake) is released, then method 400 may judge that conditions are present for a vehicle brake induced engine start. If method 400 judges that conditions are present for a vehicle brake release induced engine start, the answer is yes and method 400 proceeds to 430. Otherwise, the answer is no and method 400 proceeds to 408. The vehicle brake being released when the engine is stopped after an automatic engine stop may be referred to as a trigger condition for inducing an engine restart.

At 430, method 400 requests and commands an engine start with a medium cranking time and a medium engine acceleration rate between a time of an initial combustion event (e.g., combustion of fuel in a cylinder of the engine) in the engine since a most recent engine stop and a time when the engine reaches idle speed for a first time after the most recent engine stop. Method 420 may provide the medium length or duration engine cranking time via delaying fuel injection beginning from a time when an electric machine first begins to rotate the engine after a most recent engine stop (e.g., absence of engine rotation) for a predetermined amount of time or for a predetermined number of engine events since the time when the electric machine first begins to rotate the engine after the most recent engine stop. For example, method 400 may generate a medium engine cranking time via delaying fuel injection for 1.5 seconds after the time when the electric machine first begins to rotate the engine after the most recent engine stop. Alternatively, method 400 may generate a medium engine cranking time via delaying fuel injection for six compression strokes of the engine after the time when the electric machine first begins to rotate the engine after the most recent engine stop. In still another example, method 400 may delay fuel injection until engine intake manifold pressure is less than a second threshold pressure, the second threshold pressure greater than the first threshold pressure. The engine throttle position may be adjusted to a predetermined position (e.g., between 1% of fully open and 5% of fully open) while the engine is being cranked to control the intake manifold pressure. Method 400 begins to inject fuel when engine intake manifold pressure is less than a second threshold pressure.

Method 400 also adjusts the engine throttle opening amount and spark timing to generate a medium rate of engine acceleration between a time of the first combustion event in the engine since the most recent engine stop and a time that the engine reaches engine idle speed (e.g., 800 RPM) since the most recent engine stop. In one example, the engine throttle position may be adjusted to a predetermined position (e.g., between 1% of fully open and 5% of fully open) to generate the medium engine acceleration rate. The engine spark timing may be adjusted to a medium spark timing (e.g., between top-dead-center compression stroke and nine crankshaft degrees before top-dead-center compression stroke of the cylinder receiving the spark) during engine cranking and run-up. The medium spark timing and medium throttle opening amount may reduce engine acceleration from a maximum rate of engine acceleration between engine cranking speed and engine idle speed. Method 400 proceeds to 432.

At 432, method 400 judges if the accelerator pedal is applied to a position that is greater than a threshold position (e.g., greater than 5% of full scale accelerator pedal movement). If so, the answer is yes and method 400 proceeds to 434. Otherwise, the answer is no and method 400 proceeds to exit while the engine cranking duration is medium and while the engine acceleration rate from engine cranking speed up to engine idle speed is a medium rate of engine acceleration.

At 434, method 400 reduces the engine cranking time, if the engine is still cranking, and increases the engine acceleration rate between the time that the engine exits cranking and the time the engine reaches its idle speed. Method 400 may reduce the engine cranking time via injecting fuel earlier than the timing described at 430. For example, if fuel injection is initially delayed for 1.5 seconds after the time when the electric machine first begins to rotate the engine after the most recent engine stop, then the fuel injection may be reduced to 0.5 seconds after the time when the electric machine first begins to rotate the engine after the most recent engine stop. Further, method 400 increases the engine acceleration rate between the time of the first combustion event since the most recent engine stop and the time that the engine reaches its idle speed via increasing the throttle opening amount and advancing the engine spark timing. For example, if the engine throttle opening amount was 1% during engine cranking and run-up, the engine throttle opening amount may be increased to a positon that is a function of accelerator pedal position. Further, if the spark timing was previously five crankshaft degrees before top-dead-center compression stroke of the cylinder receiving the spark, then the engine spark timing may be advanced to ten crankshaft degrees before top-dead-center compression stroke of the cylinder receiving the spark. In these ways, engine cranking time may be reduced and engine acceleration during engine run-up may be increased when the accelerator pedal is applied after a brake release induced engine restart. Method 400 proceeds to exit.

At 408, method 400 judges if conditions are present for an accelerator pedal induced engine start. An accelerator pedal induced engine start may be initiated in response to the accelerator pedal position being greater than a threshold position (e.g., greater than 5% of full scale accelerator pedal position). The accelerator pedal position being greater than a threshold position may be referred to as a triggering event for starting the engine. If method 400 judges that the accelerator pedal position is greater than the threshold position, the answer is yes and method 400 proceeds to 410.

At 410, method 400 requests and commands an engine start with a faster or shorter cranking time and a faster engine acceleration rate between a time of an initial combustion event (e.g., combustion of fuel in a cylinder of the engine) in the engine since a most recent engine stop and a time when the engine reaches idle speed for a first time after the most recent engine stop. Method 420 may provide the shorter length or duration engine cranking time (a faster cranking time) via injecting fuel before engine cranking begins, at the time engine cranking begins, or shortly after engine cranking begins. For example, method 400 may generate a short engine cranking time via injecting fuel to engine cylinders as soon as engine cranking begins. Alternatively, method 400 may directly start the engine via injecting fuel as soon as accelerator pedal position exceeds the threshold position. The injected fuel may be injected to a cylinder that is on its expansion stroke so that the engine may begin rotating without aid of an electric machine.

Method 400 also adjusts the engine throttle opening amount and spark timing to generate a faster rate of engine acceleration between a time of the first combustion event in the engine since the most recent engine stop and a time that the engine reaches engine idle speed (e.g., 800 RPM) since the most recent engine stop. In one example, the engine throttle position may be adjusted in proportion to the distance that the accelerator pedal is applied. Thus, the throttle position may be a function of accelerator pedal position. The engine spark timing may be adjusted to an advanced spark timing (e.g., ten crankshaft degrees before top-dead-center compression stroke of the cylinder receiving the spark) during engine cranking and run-up (e.g., the time between when the engine first combusts fuel after a most recent engine stop and the time that the engine reaches its idle speed). The advanced spark timing and opened throttle may generate greater engine acceleration so that the vehicle may respond to the driver's request in a timely manner. Method 400 proceeds to exit.

At 450, method 400 maintains the engine in a stop condition and waits for engine restart conditions to be satisfied. Method 400 proceeds to exit.

In this way, the engine cranking duration and acceleration rate between engine cranking speed and engine idle speed may be adjusted to meet engine restarting conditions. Further, the engine cranking duration and acceleration rate may be adjusted to reduce engine noise and vibration to improve customer satisfaction.

Thus, the method of FIG. 4 provides for an engine operating method, comprising: adjusting an amount of engine cranking time via a controller in response to an automatic engine start triggering event; and automatically starting an engine in response to the automatic engine start triggering event via the controller. The method includes where the automatic engine start triggering event is a change in a state of a vehicle system that is not a request by a human to start the engine and that is input to a device that is dedicated solely to stopping and/or starting the engine, and where adjusting the amount of engine cranking time includes increasing the amount of engine cranking time to greater than a first threshold amount of time. The method includes where the automatic engine start triggering event is a change in a state of a vehicle brake, and where adjusting the amount of engine cranking time includes adjusting the amount of engine cranking time to less than the first threshold amount of time and to greater than a second threshold amount of time in response to the automatic engine start triggering event being the change in the state of the vehicle brake.

In some examples, the method includes where the automatic engine start triggering event is a change in a state of a vehicle accelerator pedal, and where adjusting the amount of engine cranking time includes adjusting the amount of engine cranking time to less than the second threshold amount of time in response to the automatic engine start triggering event being the change in the state of the vehicle accelerator pedal. The method includes where the amount of engine cranking time is adjusted via adjusting a time that fuel is injected to the engine. The method further comprises adjusting a throttle opening amount via the controller in response to the automatic engine start triggering event. The method further comprises adjusting spark timing via the controller in response to the automatic engine start triggering event. The method includes where the amount of engine cranking time begins at a time when a starter engages an engine to a time of a first combustion event since a most recent engine stop.

The method of FIG. 4 also provides for an engine operating method, comprising: adjusting an amount of engine cranking time via a controller in response to an automatic engine start triggering event; adjusting a rate of engine speed increase between an engine cranking speed and an engine idle speed via the controller in response to the automatic engine start triggering event; and automatically starting an engine in response to the automatic engine start triggering event via the controller. The method includes where adjusting the rate of engine speed increase between the engine cranking speed and the engine idle speed includes increasing the rate of engine speed increase to less than a first rate of engine speed increase in response to the automatic engine start triggering event being a change in a state of a vehicle system that is not generated directly via a human action. The method includes where adjusting the rate of engine speed increase between the engine cranking speed and the engine idle speed includes increasing the rate of engine speed increase to greater than the first rate of engine speed increase and less than a second rate of engine speed increase in response to the automatic engine start triggering event being a change in a state of a vehicle brake.

In some examples, the method includes where adjusting the rate of engine speed increase between the engine cranking speed and the engine idle speed includes increasing the rate of engine speed increase to greater than the second rate of engine speed increase in response to the automatic engine start triggering event being a change in a state of a vehicle accelerator pedal. The method includes where the rate of engine speed increase is adjusted via spark timing. The method includes where the rate of engine speed increase is adjusted via engine throttle position. The method includes where the amount of engine cranking time is adjusted via adjusting a time that fuel is injected to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
adjusting an amount of engine cranking time via a controller in response to an automatic engine start triggering event; and
automatically starting an engine in response to the automatic engine start triggering event via the controller, where the automatic engine start triggering event is a change in a state of a vehicle system that is not a request by a human to start the engine and that is input to a device that is dedicated solely to stopping and/or starting the engine and adjusting the amount of engine cranking time includes increasing the amount of engine cranking time to greater than a first threshold amount of time, and where the engine start triggering event is a change in a state of a vehicle brake and adjusting the amount of engine cranking time includes adjusting the amount of engine cranking time to less than the first threshold amount of time and to greater than a second threshold amount of time in response to the automatic engine start triggering event being the change in the state of the vehicle brake.

2. The method of claim 1, where the automatic engine start triggering event is a change in a state of a vehicle accelerator pedal, and where adjusting the amount of engine cranking time includes adjusting the amount of engine cranking time to less than the second threshold amount of time in response to the automatic engine start triggering event being the change in the state of the vehicle accelerator pedal.

3. The method of claim 1, where the amount of engine cranking time is adjusted via adjusting a time that fuel is injected to the engine.

4. The method of claim 1, further comprising adjusting a throttle opening amount via the controller in response to the automatic engine start triggering event.

5. The method of claim 1, further comprising adjusting spark timing via the controller in response to the automatic engine start triggering event.

6. The method of claim 1, where the amount of engine cranking time begins at a time when a starter engages the engine to a time of a first combustion event since a most recent engine stop.

7. An engine operating method, comprising:
adjusting a rate of engine speed increase between an engine cranking speed and an engine idle speed via a controller in response to an automatic engine start triggering event; and
automatically starting an engine in response to the automatic engine start triggering event via the controller, where adjusting the rate of engine speed increase between the engine cranking speed and the engine idle speed includes increasing the rate of engine speed increase to less than a first rate of engine speed increase in response to the automatic engine start triggering event being a change in a state of a vehicle system that is not generated directly via a human action, and where adjusting the rate of engine speed increase between the engine cranking speed and the engine idle speed includes increasing the rate of engine speed increase to greater than the first rate of engine speed increase and less than a second rate of engine speed increase in response to the automatic engine start triggering event being a change in a state of a vehicle brake.

8. The method of claim 7, where adjusting the rate of engine speed increase between the engine cranking speed and the engine idle speed includes increasing the rate of engine speed increase to greater than the second rate of engine speed increase in response to the automatic engine start triggering event being a change in a state of a vehicle accelerator pedal.

9. The method of claim 7, where the rate of engine speed increase is adjusted via spark timing.

10. The method of claim 7, where the rate of engine speed increase is adjusted via engine throttle position, and further comprising:
    adjusting an amount of engine cranking time via a controller in response to the automatic engine start triggering event.

11. The method of claim 10, where the amount of engine cranking time is adjusted via adjusting a time that fuel is injected to the engine.

12. A system, comprising:
    an engine; and
    a controller including executable instructions stored in non-transitory memory to adjust an engine cranking time to a first amount of time and an engine acceleration rate to a first acceleration rate in response to releasing a brake, and to adjust an engine cranking time to a second amount of time and an engine acceleration rate to a second acceleration rate in response to applying an accelerator pedal.

13. The system of claim 12, where the first amount of time is longer than the second amount of time.

14. The system of claim 12, where the first acceleration rate is lower than the second acceleration rate.

15. The system of claim 12, further comprising additional instructions to adjust the engine cranking time to a third amount of time in response to a system initiated engine start request that is not directly based on an operator action.

16. The system of claim 12, where the engine cranking time is adjusted via adjusting a time fuel is injected to the engine.

* * * * *